July 3, 1956 H. A. SUMNER 2,752,842

AUTOMOBILE AIR CONDITIONER

Filed May 31, 1952 3 Sheets-Sheet 1

INVENTOR.
H. A. Sumner
BY C. M. McKnight
ATTORNEY

INVENTOR.
H. A. Sumner
BY
C. M. McKnight
ATTORNEY

AUTOMOBILE AIR CONDITIONER

Filed May 31, 1952 3 Sheets-Sheet 3

INVENTOR.
H. A. Sumner
BY
C. M. McKnight
ATTORNEY

United States Patent Office 2,752,842

Patented July 3, 1956

2,752,842

AUTOMOBILE AIR CONDITIONER

Harold A. Sumner, Tulsa, Okla.

Application May 31, 1952, Serial No. 291,040

1 Claim. (Cl. 98—2)

This invention relates to improvements in air cooling units particularly adapted for use in vehicles, such as passenger automobiles and the like.

The invention contemplates a compact unit of a size to be secured in an automobile in front of and below the dashboard. It is contemplated to provide a box like housing for the apparatus which also serves as a water reservoir. A conical shaped filter is supported in the housing in such a manner, and is revolved to constantly move a portion of the filter through a body of water, thereby continuously wetting the filter. Air is forced through the housing in such a manner to pass through an exposed portion of the conical filter whereby the humidity of the air is increased and the temperature of the air is decreased.

It is contemplated to discharge the cool air through the glove compartment of the automobile toward the occupants in the front seat of the automobile. Suitable louvers may be provided in the glove compartment to direct cool air in any desired direction.

An important object of this invention is to provide a compact air cooling unit adapted for use in automobiles.

Another object of this invention is to eliminate the use of various liquid conduits in air cooling units which inherently become clogged or inoperative after extended use.

A further object of this invention is to provide an air cooling unit utilizing a substantially conical shaped filter which is adapted to be revolved partially within a body of water.

Another object of this invention is to provide an air cooling unit for automobiles and the like which may be installed without defacing any portion of the automobile and without intruding upon the utilizable space in the automobile.

A still further object of this invention is to provide a simple and efficient air cooling unit which may be economically manufactured.

Other objects and advantages of the invention will be evident from the following detailed description, read in conjunction with the accompanying drawings, which illustrate my invention.

Figure 1:
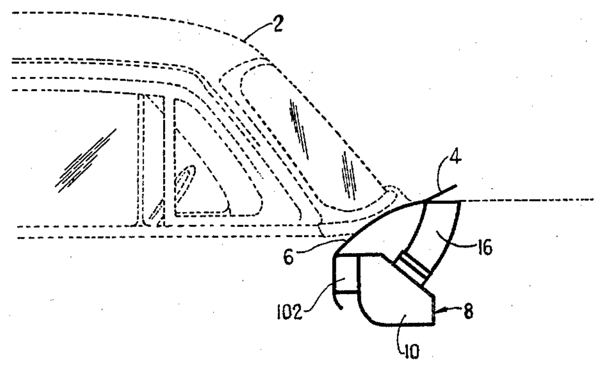
Figure 1 is a phantom view of a portion of an automobile illustrating the installation of my novel cooling unit therein.

Referring to the drawings in detail, and particularly

Figure 2:
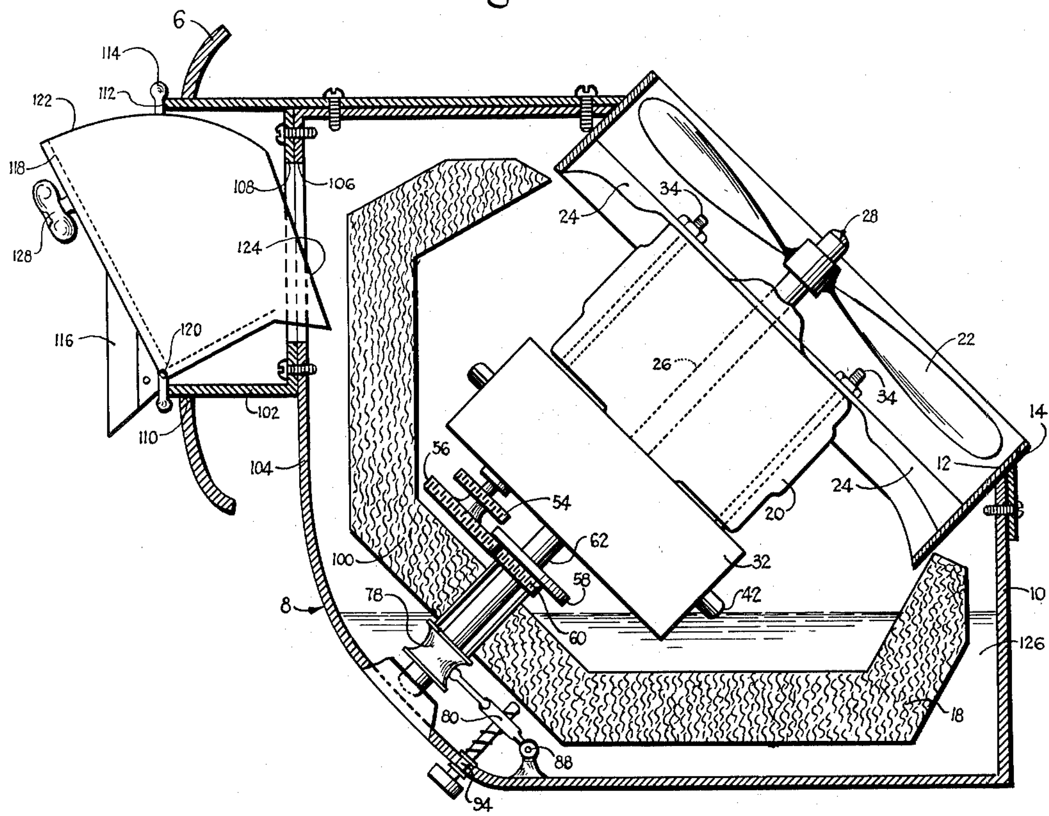
Figure 2 is a transverse enlarged sectional view of the cooling unit shown in Fig. 1.

Figs. 1 and 2, reference character 2 designates an automobile having an air cowl 4 and a dashboard 6. My novel air cooling unit generally indicated at 8 is adapted to be secured slightly forward of the dashboard 6 in any suitable manner, such as by brackets or the like (not shown). The cooling unit 8 comprises a box like housing 10 having an air inlet 12 surrounded by a ring 14. The ring 14 is secured to the walls of the housing 10 in any suitable manner, such as by welding. An air hose 16 is connected at its opposite ends to the air cowl 4 and the ring 14 to direct fresh air into the housing 10 as will be more fully hereinafter set forth.

The air cooling unit 8 generally comprises a substantially conical shaped filter 18 adapted to be driven by an electric motor 20 and a fan 22 disposed in the air inlet 12 and also adapted to be driven by the motor 20. The motor 20 is supported in an inclined position in the housing 10 by suitable radial arms 24 extending inwardly from the ring 14. The motor 20 is provided with a source of electrical energy from the electrical system of the automobile 2 in any suitable manner (not shown). A drive shaft 26 extends from the opposite ends of the motor 20 to drive the fan 22 and the filter 18. The fan 22 is secured to the upper end 28 of the drive shaft 26 above the support arms 24 concentrically in the ring 14. The blades of the fan 22 are pitched in such a manner that the air is drawn into the housing 10 upon operation of the fan, as will be more fully hereinafter set forth.

Figure 4:
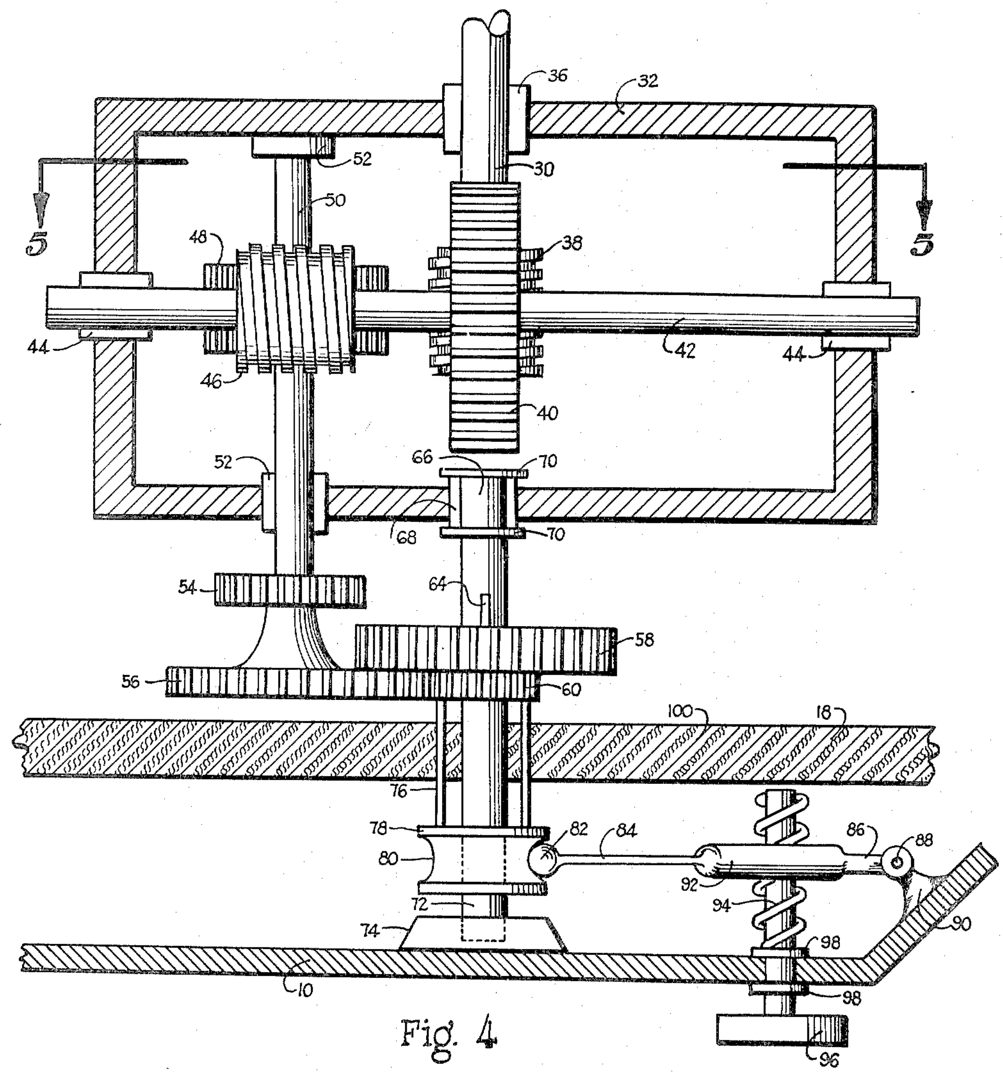
Figure 4 is an enlarged sectional view of a portion of the air cooling unit.
Figure 3:
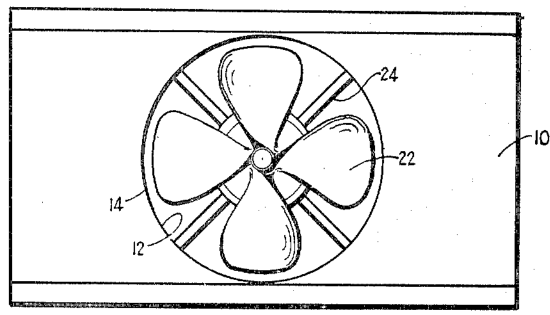
Figure 3 is a rear elevational view of the air cooling unit.
Figure 5:
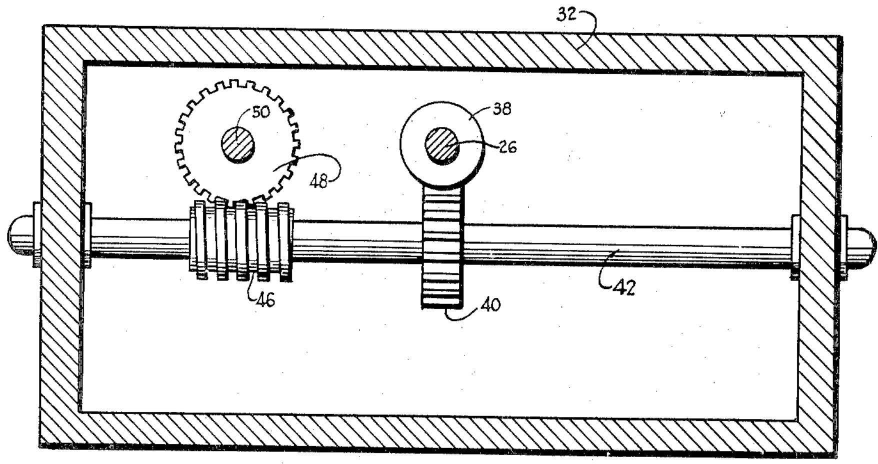
Figure 5 is a sectional view taken along lines 5—5 of Fig. 4.

As clearly shown in Fig. 4, the lower end 30 of the drive shaft 26 extends into a gear box 32. The gear box 32 is secured to the lower end of the motor 20 in any suitable manner, such as by the tie bolts 34 shown in Fig. 2. A sleeve type bearing 36 is provided in the top wall of the gear box 32 around the drive shaft 26 in the usual manner. The drive shaft 26 terminates in the medial portion of the gear box 32 and has a worm gear 38 rigidly secured on the extreme lower end thereof. The worm gear 38 engages a circular gear 40 which is rigidly mounted on an idler shaft 42 extending transversely in the gear box 32. Opposed sleeve bearings 44 are provided in the opposite end walls of the gear box 32 to rotatably support the idler shaft 42. It will be apparent that upon operation of the motor 20, the worm gear 38 cooperates with the circular gear 40 to rotate the idler shaft 42.

A second worm gear 46 is rigidly secured on the idler shaft 42 in spaced relation to the circular gear 40. The worm gear 46 engages a circular gear 48 rigidly secured on a vertically disposed shaft 50. Suitable bearings 52 provided in the top and bottom walls of the gear box 32 receive and support the shaft 50. The shaft 50 extends downwardly from the gear box 32 and has a pair of circular gears 54 and 56 rigidly secured on the lower end thereof. The gear 54 is smaller in diameter than the gear 56.

A pair of control gears 58 and 60 cooperate with the gears 54 and 56. The control gears 58 and 60 are rigidly interconnected and are slidingly disposed on a shaft 62 which is supported in the housing 10 in parallel relationship with the shaft 50. A key partially shown at 64 interconnects the gears 58 and 60 with the shaft 62 to permit longitudinal movement of the gears and to provide rotation of the shaft 62 upon rotation of the gears 58 and 60. The upper end 66 of the shaft 62 extends into a bearing 68 provided in the lower wall of the gear box 32. A pair of collars 70 are secured on the shaft 62 at the opposite ends of the bearing 68 to preclude longitudinal movement of the shaft 62. The lower end 72 of the shaft 62 extends into a suitable bearing 74 provided on the inner face of the housing 10. A plurality of circumferentially shaped rods 76 extend downwardly from the lower control gear 60 and are interconnected at the lower ends to a collar 78. The collar 78 is slidingly disposed on the shaft 62 to permit movement of the collar 78 simultaneously with the gears 58 and 60.

A circumferential groove 80 is provided in the outer surface of the collar 78 to receive the outer enlarged end 82 of a control lever 84. The end 82 of the lever 84 is ball shaped to cooperate with the groove 80, as will be hereinafter set forth. The inner end 86 of the lever 84 is pivotally secured by a pin 88 and bracket 90 to the housing 10. A medial portion 92 of the lever 84 is enlarged and is provided with a threaded aperture (not shown) to receive a threaded shaft 94. The shaft 94 extends downwardly through the housing 10 and has a knob 96 on the lower end thereof to permit manual rotation of the shaft. A pair of collars 98 are secured on the shaft 94 in contact with the opposite faces of the housing 10 to preclude longitudinal movement of the shaft.

It will be apparent that upon rotation of the threaded shaft 94, the lever 84 is pivoted on the pin 88, whereupon the end 82 of the lever 84 cooperates with the groove 80 to vary the longitudinal position of the collar 78 on the shaft 62. The rods 76 will transmit the motion of the collar 78 to the control gears 58 and 60 for controlling the engagement of the gears 58 and 60 with the gears 54 and 56. In one position of the collar 78, the large control gear 58 engages the small driving gear 54 and in a second position of the collar 78, the small control gear 60 engages the large driving gear 56. Thus, the shaft 62 may be rotated at either of two speeds when the shaft 50 is rotated at a constant speed.

Figure 6:
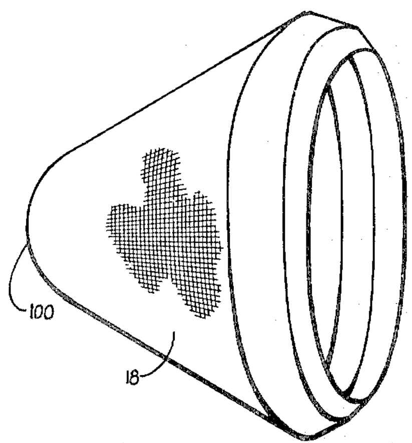
Figure 6 is a perspective view of the filter.

The filter 18 is rigidly secured on the shaft 62 between the lower control gear 60 and the collar 78. The arms 76 also extend through the filter 18 and may be moved longitudinally through the filter upon movement of the collar 78. As previously stated, and as clearly shown in Fig. 6, the filter 18 is substantially conical shaped. The filter 18 is of a size to extend around the motor 20 when the lower enclosed end 100 thereof is secured on the shaft 62 as shown in Figs. 2 and 6. It will be noted that the center line of the filter 18 is substantially in alignment with the drive shaft 26 of the motor 20, thereby positioning the filter 18 in such a manner that the lower side wall thereof extends horizontally in the housing 10 adjacent the lower end wall thereof.

Figure 7:
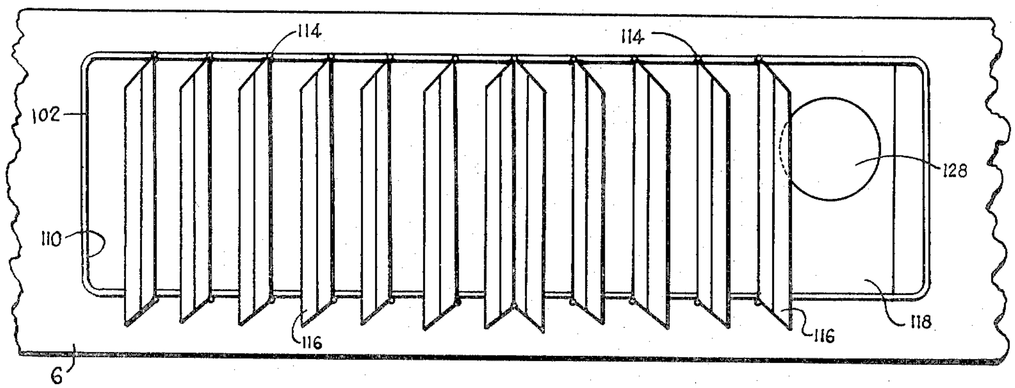
Figure 7 is an elevational view of the dashboard of an automobile having my air cooling unit installed therein.

A second smaller housing 102 is secured to the front wall 104 of the housing 10. Complementary openings 106 and 108 are provided in the wall 104 and the housing 102 to permit a discharge of cool air from the housing 10 through the housing 102, as will be hereinafter set forth. The housing 102 is of a size to fit in the glove compartment opening 110 (see also Fig. 7) of the automobile dashboard 6. The outer end 112 of the housing 102 is open and has a plurality of vertically disposed and horizontally spaced rods 114 secured thereover. The rods 114 are provided to pivotally secure a plurality of louvers 116 over the open end 112 of the housing 102. It will be apparent that the louvers 116 may be turned either to the left or the right to direct the cool air in the desired direction into the interior of the automobile 2.

A spout 118 is pivotally secured on a pin 120 in the housing 102 as clearly shown in Fig. 2. The upper end 122 and the forward end 124 of the spout 118 are open to receive and discharge water therefrom. When the spout 118 is in the open position as shown in Fig. 2, a supply of water may be readily poured into the upper end 122 thereof. Upon pivoting the spout 118 to the right to a closed position (not shown), the water is discharged through the forward end 124 into the housing 10. Obviously, the water will fall or flow downwardly in the housing 10 to form a reservoir or body of water 126 in the lower portion thereof. The level of the water 126 is preferably such that the lower portion of the filter 18 will be emersed therein. A suitable knob 128 is provided on the outer end of the spout 118 to facilitate the manual pivoting thereof. It will be apparent that the openings 106 and 108 are enlarged adjacent the spout 118 to permit the pivoting operation of the spout.

*Operation*

When the motor 20 is placed in operation, the drive shaft 26 rotates the fan 22 to force fresh air from the automobile cowl 4 through the air conduit 16 and air inlet 12 into the housing 10. As the air flows through the housing 10, it is forced through the upper portion of the filter 18 and then through the openings 106 and 108 and the housing 102 into the interior of the automobile 2. Simultaneously with the operation of the fan 22, the drive shaft 26 rotates the worm gear 38 (Fig. 4) to rotate the ring gear 40. The ring gear 40 in turn rotates the idler shaft 42 and its worm gear 46. In addition, the worm gear 46 engages the ring gear 48 to drive the shaft 50 and the drive gears 54 and 56. With the control gears 58 and 60 disposed in the positions as shown in Fig. 4, the driving gear 56 engages the small control gear 60 to simultaneously rotate the shaft 62 and revolve the filter 18. As the filter 18 is revolved about its longitudinal center line, the lower portion thereof is moved through the body of water 126 to provide a continuous wetting of the filter. Therefore, when the air is blown through the upper portion of the filter 18, it will become partially saturated with the water and cooled.

It will be noted that in the present construction, only a portion of the filter is exposed to the air stream, and the exposed portion is continuously replaced by a portion which has been saturated with water. Thus the filter is continuously resaturated without the use of numerous water conduits. The filter will, of course, be revolved at a lesser speed than the fan.

To decrease the speed of rotation of the filter 18, and thus the saturation rate thereof, the knob 96 is turned in a counter-clockwise direction. The threaded shaft 94 thereby cooperates with the lever 84 to pivot the lever 84 in a clockwise direction. The end 82 of the lever 84, being disposed in the groove 80, moves the collar 78 and the interconnected control gears 58 and 60 in an upward direction on the shaft 62. The large control gear 58 is thus brought into engagement with the small driving gear 54, and the small control gear 60 is disengaged from the large driving gear 56. The small driving gear 54 and large control gear 58 will rotate the shaft 62 and hence, the filter 18, at a decreased speed.

From the foregoing, it is apparent that the present invention provides a compact air cooling unit particularly adapted for use in automobiles and the like. The unit is installed in the automobile by utilizing the glove compartment and without defacing the automobile in any manner. Thus, the unit may be conveniently removed during the winter seasons, if desired. It will also be apparent that the present invention provides a novel cooling unit utilizing a revolving substantially conical shaped filter. The filter is continuously wetted by revolving the same through a body of water, thus eliminating all water circulating conduits. The water supply may be readily replenished from the interior of the automobile.

It will also be apparent that the invention provides a means of regulating the speed of the filter without affecting the speed of the fan. In high gear, the filter remains saturated with water and air passing therethrough becomes extremely moist and is cooled to the lowest temperature, however, the volume of air is slightly reduced due to the film of water suspended in the filter and not completely drained away. It would be obvious that this high gear would be preferably selected on hot dry days. The low gear would be preferably selected on hot humid days in order to increase the volume of cooled air and decrease the humidity inside the automobile, as well as to compensate for the increase in the speed of the air cooling unit when the automobile reaches a certain speed. The electrical output is increased as the automobile generation is increased.

The invention also contemplates the collection of the dust and other foreign material in the air passing through the filter unit which is permitted to deposit in the water reservoir, thereby providing not only a cooling unit, but a filtering unit of clean, cool air for the accommodation of the passengers in the automobile.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

An air cooling unit for an automobile having a cowl and a dashboard provided with a glove compartment, and comprising a housing member secured to the dashboard adjacent the glove compartment, conduit means providing communication between the cowl and the interior of the housing for directing air into the housing, a water reservoir provided in the lower portion of the housing, a substantially conical shaped filter member rotatably supported in the housing with the lower side wall portion thereof substantially horizontally disposed and extending into the water, means for rotating the filter member about its longitudinal axis whereby the filter is constantly moved through the water to be wetted thereby, said means comprising a motor supported in the housing in longitudinal alignment with the filter member, said motor directly connected to the filter for rotation thereof, a fan member provided in axial alignment with the filter member to force the incoming air through the wetted portion of the filter extending above the water, means connecting said motor to said fan for actuation thereof, a second housing disposed in the glove compartment, apertured means providing communication between the first mentioned and second mentioned housings, a spout member pivotally secured in the second housing adapted to receive a supply of water in one position thereof and adapted to discharge the water into the reservoir in a second position thereof, and louver means for discharging cooled air from the glove compartment into the interior of the automobile.

References Cited in the file of this patent

UNITED STATES PATENTS

| | | |
|---|---|---|
| 1,372,667 | Bendix et al. | Mar. 29, 1921 |
| 1,415,515 | Bouillon | May 9, 1922 |
| 1,616,545 | Perkins | Feb. 8, 1927 |
| 2,001,833 | Byrd | May 21, 1935 |
| 2,289,825 | Burton et al. | July 14, 1942 |
| 2,364,249 | Steele | Dec. 5, 1944 |
| 2,431,146 | Steele | Nov. 18, 1947 |
| 2,432,755 | Hanson | Dec. 16, 1947 |
| 2,587,197 | Mousel | Feb. 26, 1952 |
| 2,631,023 | Bailey | Mar. 10, 1953 |